US005857492A

United States Patent [19]

Salamun

[11] Patent Number: 5,857,492

[45] Date of Patent: Jan. 12, 1999

[54] ELECTROMAGNETIC FRICTION LOCK FOR A DUAL AXIS CONTROL DEVICES

[75] Inventor: Charles P. Salamun, Waukesha, Wis.

[73] Assignee: HUSCO International, Inc., Waukesha, Wis.

[21] Appl. No.: 45,435

[22] Filed: Mar. 20, 1998

[51] Int. Cl.[6] .......................... F15B 13/04; F16K 11/18; F16K 31/06

[52] U.S. Cl. ...................... 137/636.1; 74/471 R; 74/527; 74/531; 251/65; 251/297; 335/215

[58] Field of Search ................................ 137/596, 596.1, 137/625.6, 625.68, 636, 636.1, 636.2; 74/471 R, 471 XY, 475, 527, 529, 531; 91/465; 251/65, 89, 95, 297; 335/215

[56] References Cited

U.S. PATENT DOCUMENTS

| | | | |
|---|---|---|---|
| 2,667,237 | 1/1954 | Rabinow | 188/88 |
| 2,958,233 | 11/1960 | Johnson | 137/636.2 |
| 3,365,975 | 1/1968 | Hathaway | 74/471 |
| 4,342,335 | 8/1982 | Reinicker et al. | 251/297 |
| 4,777,981 | 10/1988 | Petro | 137/636.2 |
| 4,827,982 | 5/1989 | Inagaki | 137/636.1 |
| 5,184,646 | 2/1993 | Hori et al. | 137/636.2 |
| 5,396,266 | 3/1995 | Brimhall | 345/161 |
| 5,638,866 | 6/1997 | Mueller | 137/636.2 |
| 5,743,297 | 4/1998 | Mueller | 137/636.2 |

*Primary Examiner*—George L. Walton
*Attorney, Agent, or Firm*—Quarles & Brady

[57] ABSTRACT

A manually operable control device, such as a joystick, includes a plurality of actuators for operating hydraulic valves of a machine. A handle has a sphere received within a cavity formed between a pair of seat portions which are moveable with respect to each other. The handle produces movement of at least one of the plurality of actuators when the sphere is pivoted within the cavity. An electromagnetic coil generates a magnetic field that causes the seat portions to be attracted toward each other which increases friction between the sphere and the seat. A control circuit applies electric current to the electromagnetic coil whenever the machine is turned on and disconnects the electric current when the machine is turned off. The friction between the sphere and the seat holds the control device in an operating position set by the machine operator and springs return the control device to a neutral position when the machine is turned off.

17 Claims, 2 Drawing Sheets

ELECTROMAGNETIC FRICTION LOCK FOR A DUAL AXIS CONTROL DEVICES

BACKGROUND OF THE INVENTION

The present invention relates to manual control devices for operating machinery, and in particular to dual axis "joystick" type control devices for use in operating hydraulic valves.

Construction and agricultural equipment often employ a control device which the operator manipulates to control movement of a member that is driven by hydraulic actuators. One type of such control devices is commonly referred to as a "joystick." A single axis joystick has a handle which is pivoted in one direction to open a valve and is pivoted in an opposite direction to open another valve thereby controlling flow of hydraulic fluid to a bidirectional actuator. A dual axis joystick may be pivoted about two orthogonal axes to operate valves that control movement of the member about two axes.

In both versions, the control device has a neutral position in which the handle is vertical. Movement in either direction from vertical about a given axis operates a different valve causing the associated actuator to move in the corresponding direction. The valves or the mechanical linkage between the control device and the valves are biased by springs which cause the control device to return to the neutral position upon being released by the operator. Therefore, in order to maintain the valve in a given position the operator must constantly apply force to the joystick handle in order to prevent the control device from returning to the neutral position.

SUMMARY OF THE INVENTION

A general object of the present invention is to provide a control device which is retained in an operational position to which the control device is moved by the operator.

Another object of the present invention is to provide an electromagnetic friction lock for the control device.

A further object of the present invention is to provide a mechanism for returning the control device to a neutral position when electric current is removed from the electromagnetic friction lock.

These and other objectives are satisfied by a control device that includes a plurality of actuator members, each of which operates a hydraulic valve of a machine. A seat comprises first and second sections which are moveable with respect to each other and which form a cavity. A handle has a sphere received within the cavity of the seat and the handle produces movement of at least one of the actuator members when the sphere is pivoted within the cavity. An electromagnetic coil is operatively coupled to the seat to produce a magnetic field which causes the first and second portions to move toward each other. That movement increases friction between the sphere and the seat to hold the control device in a position set by an operator of the machine. However, the operator is able to overcome that friction and manually move the control device. When the electromagnetic coil is de-energized, a spring returns the control device to a neutral position.

The preferred embodiment of the invention provides a control circuit which applies an electric current to the electromagnetic coil whenever the prime mover is turned on and disconnects that electric current when the prime mover is turned off. A control element preferably is included to vary the magnitude of the electric current and thus the friction created between the sphere and the seat.

DETAILED DESCRIPTION OF THE INVENTION

Figure 1:
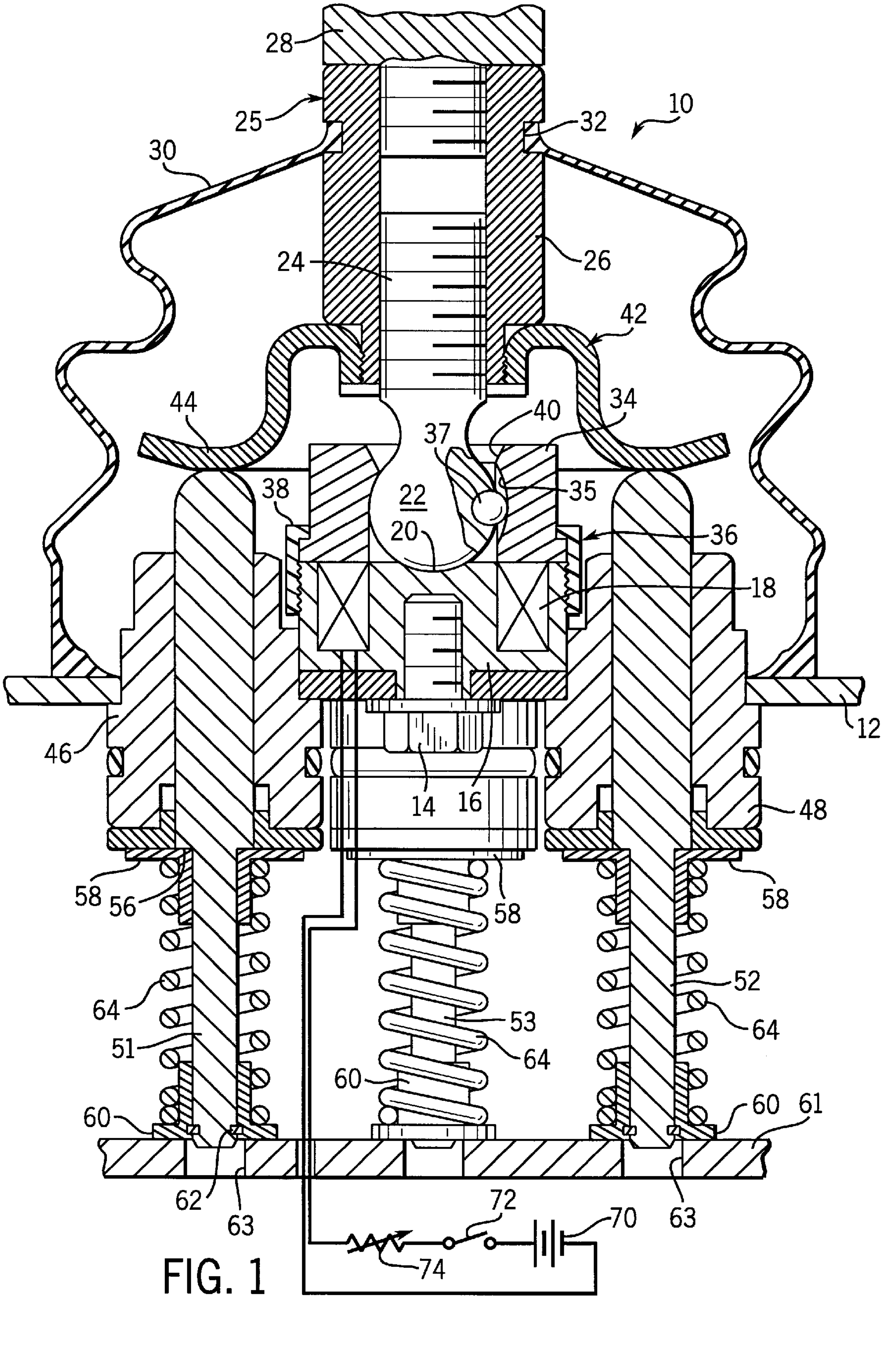
FIG. 1 is a cross sectional view through a joystick type control device which incorporates the present invention.

With initial reference to FIG. 1, a manual operable control device, such as a joystick 10, is mounted on a plate 12 of a housing by a bolt 14 which passes through an opening in the plate and threads into a hole in a shell 16. The shell 16 has an annular groove within which an electromagnet coil 18 is wound and an upper surface with a spherical depression 20. A threaded shaft 24 has a ball 22 at one end which is located in the depression and another end which extends into a threaded aperture in a handle stud 26. A conventional grip 28 also is threaded into the handle stud 26. The ball 22, threaded shaft 24, handle stud 26 and grip 28 form a handle 25.

A rubber boot 30 has a relatively small aperture which extends around an annular notch 32 in the handle stud 26. The boot 30 has a larger diameter opening which is sealed against the housing plate 12 to provide a water and dust tight enclosure for the working components of the control device 10.

The sphere 22 at one end of the control device handle 25 is held against the shell 16 by an annular clapper 34 which has a wide opening at one end through which the ball is able to pass. The clapper 34 is held adjacent the shell 16 by a non-magnetic retaining ring 36 threaded onto the shell 16 with a flange 38 that engages a lip on the clapper. The retaining ring 36 does not hold the clapper 34 tightly against the shell 16 thereby permitting a limited amount of movement of the clapper. The shell 16, clapper 34 and the ball 22 are made of a steel material that is known for its magnetic properties. The shaft 24 extends through a smaller diameter opening in the surface of the clapper 32 which is remote from the shell 16. This opening is large enough to allow the ball to pivot within the clapper and the shaft to move in the full range of two dimensional movement as required to operate the control device. However, this opening 40 is smaller than the diameter of the sphere 22 so that the sphere is unable to pass through that opening and is retained in a cavity of the seat 41 formed by the clapper 32 and the shell 16.

The portion of that cavity in the clapper 34 has a generally circular cross-section with an elongated concave groove 35 at one side. A ball bearing 37 is received within the concave groove 35 and within a spherical depression in the handle sphere 22. The ball bearing 37 prevents the handle 25 from rotating about its longitudinal axis while permitting the handle to pivot about two orthogonal axes. Specifically, the handle 25 can be pivoted left or right in the plane of the drawing, as well as into and out of the plane of the drawing.

An actuator cup 42 is threaded onto the exterior of the handle stud 26 and has an outwardly extending circular flange 44. The flange 44 contacts four valve actuator shafts, three of which 51, 52 and 53 are visible in FIG. 1. The fourth actuator shaft is part of the valve section which is cut away in the cross-sectional view and otherwise would be aligned directly on top of the third actuator shaft 54 above the plane of the drawing. By pivoting the handle 25 to the left or right in the plane of the drawing, the first or second actuator shaft 51 or 52, respectively, will be pressed downward. This action pushes the respective actuator shaft 51 and 52 downward through its associated collar 46 or 48 which extends through an aperture in plate 12. By pivoting the handle 25 into and out of the plane of the drawing, the third actuator shaft 53 and the fourth actuator shaft (not visible) are operated respectively in the same manner.

Figure 2:
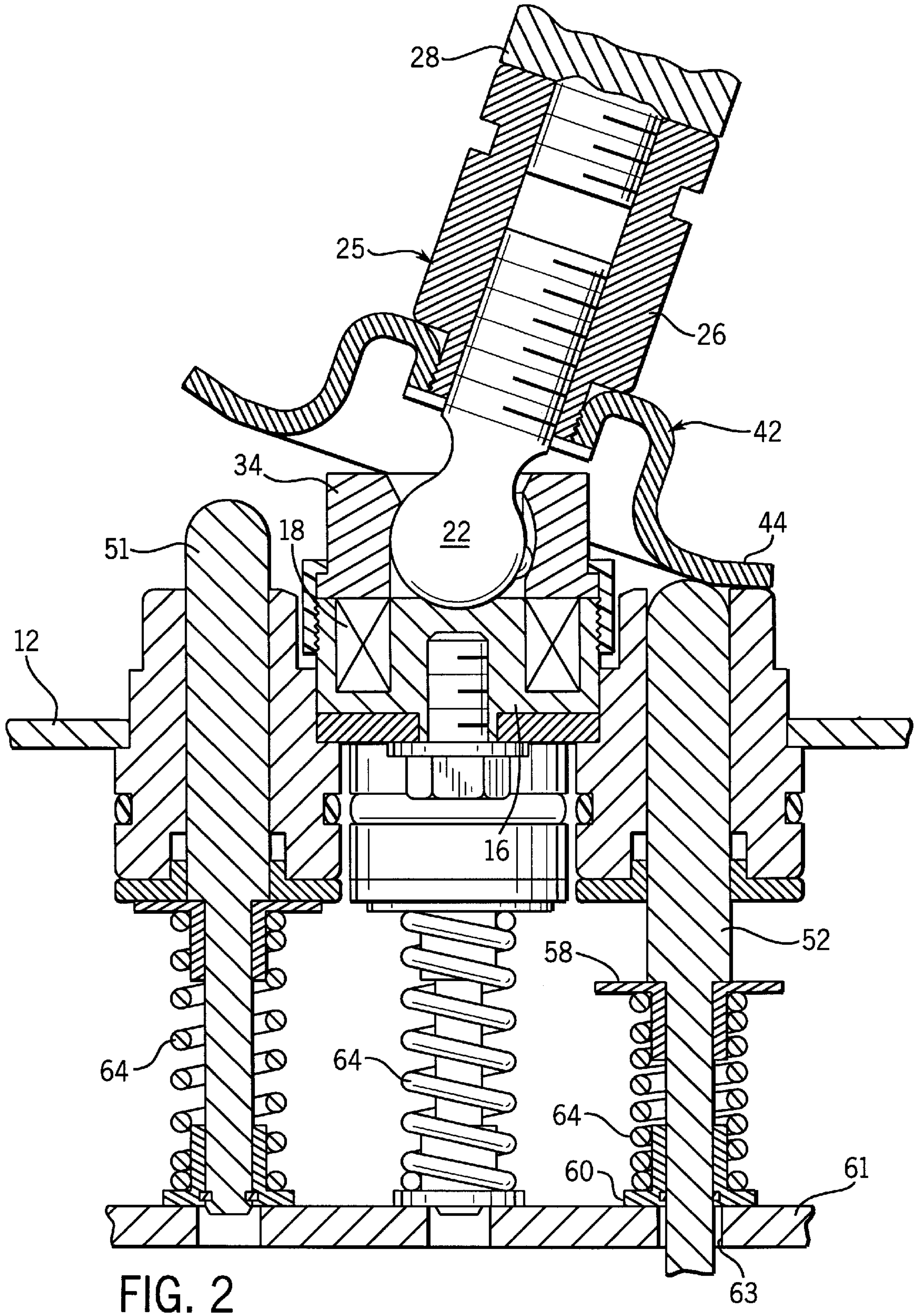
FIG. 2 is a cross section through the joystick which has been moved from the neutral position into an operating position.

Each actuator shaft 51–53 has a shoulder 56 against which a tubular spring retainer 58 abuts. A second opposing spring retainer 60 abuts a snap ring 62 in a notch at the exposed end of the actuator shaft in this neutral position of the control device depicted in FIG. 1. A compression spring 64 extends between the two spring retainers 58 and 60 biasing them apart. The lower spring retainers 60 abut the bottom wall 61 of the control device enclosure with apertures 63 through which the actuator shafts 51–53 are pushed when the operator moves the handle 25, as shown in FIG. 2 with respect to shaft 52. An actuator shaft 51–53 projecting downward through the bottom wall 61 operates a separate hydraulic valve (not shown).

When electric current is applied to the electromagnet coil 18, a magnetic field is produced which pulls the clapper 34 toward the coil. This action squeezes the sphere 22 of the control device handle 25 between the clapper 34 and the shell 16 increasing the friction acting on the sphere. For example, in construction equipment such as a backhoe, the electromagnet coil 18 may be connected to a battery 70 by the ignition switch 72. The ignition switch 72 controls an engine that drives a pump which supplies pressurized hydraulic fluid to the valves. A variable resistor 74 in series with the ignition switch 72 serves as a circuit element which varies the magnitude of electric current applied to the electromagnetic coil and thus the friction applied to the sphere 22. The operator is able to control that friction so that the handle remains in the position to which it is moved. Thus the friction prevents the force exerted by springs 64 from returning the control device from the position shown in FIG. 2 to the neutral position of FIG. 1. The magnitude of the friction is set to a level at which the operator still is able to move the control device handle 25.

When the ignition switch is turned off, the electric current is disconnected from the electromagnetic coil 18 thereby terminating production of the magnetic field. With the magnetic field removed, the sphere 22 is released allowing the force of springs 64 to return the handle 25 to the neutral position shown in FIG. 1. In this neutral position none of the actuator shafts operate a hydraulic valve.

I claim:

1. A control device for operating a plurality of hydraulic valves, said control device comprising:

- a plurality of actuator members, each for engaging one of the plurality of hydraulic valves;
- a seat having a first and second portions moveable with respect to each other and forming a cavity;
- a handle having a sphere received within the cavity of the seat, wherein the handle produces movement of at least one of the plurality of actuator members when the sphere is pivoted within the cavity; and
- an electromagnetic coil operatively coupled to the seat to produce a magnetic field which causes the first and second portions to move toward each other thereby increasing friction between the sphere and the seat.

2. The control device as recited in claim 1 wherein the first portion of the seat has an annular groove within which the electromagnetic coil is received.

3. The control device as recited in claim 2 wherein second portion of the seat is an annular clapper formed of magnetic material and having an aperture through which the handle extends.

4. The control device as recited in claim 1 wherein the handle comprises an outwardly projecting flange for engaging the plurality of actuator members.

5. The control device as recited in claim 1 wherein the plurality of actuator members are arranged around the sphere and the handle has an outwardly projecting flange for engaging the plurality of actuator members.

6. The control device as recited in claim 1 wherein the plurality of actuator members are arranged symmetrically around the handle.

7. The control device as recited in claim 1 further comprising a plurality of spring assemblies, wherein each one biases a different one of the plurality of actuator members.

8. The control device as recited in claim 7 wherein each of the plurality of actuator members has a shoulder which is engaged by one of the plurality of spring assemblies.

9. The control device as recited in claim 1 further comprising a switch connecting the electromagnetic coil to a source of electric current, and being in a closed state whenever pressurized fluid is applied to the a plurality of hydraulic valves and otherwise being in an open state.

10. The control device as recited in claim 9 further comprising a circuit element in series with the switch for varying the magnitude of electric current applied to the electromagnetic coil.

11. The control device as recited in claim 1 further comprising a ball received within a spherical depression in the sphere and received within a groove in the cavity of the seat, wherein the ball restricts rotational movement of the handle while permitting the handle to be pivoted about two axes.

12. A control device for operating a plurality of hydraulic valves of a machine having a prime mover, said control device comprising:

- a plurality of actuator members, each one for engaging one of the plurality of hydraulic valves;
- a plurality of springs which bias the plurality of actuator members into neutral positions;
- a seat having a first and second portions moveable with respect to each other and forming a cavity;
- a handle having a sphere received within the cavity of the seat, wherein the handle produces movement of at least one of the plurality of actuator members when the sphere is pivoted within the cavity;
- an electromagnetic coil operatively coupled to the seat and which when energized produces a magnetic field that causes the first and second portions to be attracted toward each other which increases friction between the sphere and the seat; and
- a control circuit for applying an electric current to the electromagnetic coil whenever the prime mover is turned on and wherein the electric current is disconnected from the electromagnetic coil when the prime mover is turned off.

13. The control device as recited in claim 12 wherein the first portion of the seat is a shell with an annular groove with in which the electromagnetic coil is received.

14. The control device as recited in claim 13 wherein second portion of the seat is an annular clapper formed of magnetic material and having an aperture through which the handle extends.

15. The control device as recited in claim 12 wherein the handle comprises an outwardly projecting flange for engaging the plurality of actuator members.

16. The control device as recited in claim 12 wherein the control circuit comprises a switch connecting the electromagnetic coil to a source of electric current, and the switch being in a closed state whenever the prime mover is turned on and otherwise being in an open state.

17. The control device as recited in claim 16 wherein the control circuit further comprises a circuit element in series with the switch for varying the magnitude of electric current applied to the electromagnetic coil.

* * * * *